(12) United States Patent
Hodson

(10) Patent No.: US 7,981,492 B2
(45) Date of Patent: Jul. 19, 2011

(54) FILM STRUCTURES AND PACKAGES THEREFROM USEFUL FOR RESPIRING FOOD PRODUCTS THAT RELEASE $CO_2$ AMOUNTS

(75) Inventor: Jay D. Hodson, Greenville, WI (US)

(73) Assignee: Exopack, LLC, Spartanburg, SC (US)

( * ) Notice: Subject to any disclaimer, the term of this patent is extended or adjusted under 35 U.S.C. 154(b) by 0 days.

(21) Appl. No.: 12/259,512

(22) Filed: Oct. 28, 2008

(65) Prior Publication Data

US 2010/0104881 A1    Apr. 29, 2010

(51) Int. Cl.
*B27N 5/02*     (2006.01)

(52) U.S. Cl. ............ 428/34.9; 428/36.7; 428/475.5; 428/475.8; 428/520; 525/56; 525/58; 264/173.15

(58) Field of Classification Search .......... 428/34.9, 428/36.7, 475.5, 475.8, 520; 525/56, 58; 264/173.15
See application file for complete search history.

(56) References Cited

U.S. PATENT DOCUMENTS

| | | |
|---|---|---|
| 4,291,092 A | 9/1981 | Weiner |
| 4,421,823 A | 12/1983 | Theisen et al. |
| 4,612,221 A * | 9/1986 | Biel et al. .............. 428/35.4 |
| 5,382,470 A | 1/1995 | Vicik |
| 6,224,956 B1 | 5/2001 | Shah |
| 6,316,067 B1 * | 11/2001 | Edwards et al. ........ 428/34.9 |
| 6,511,688 B2 | 1/2003 | Edwards et al. |
| 7,008,677 B2 * | 3/2006 | Hodson et al. ........ 428/35.7 |

* cited by examiner

*Primary Examiner* — Leszek Kiliman
(74) *Attorney, Agent, or Firm* — Stoel Rives LLP

(57) ABSTRACT

Multilayer laminates useful in packaging of respiring food products and packages made therefrom. The laminates have a $CO_2$ permeability rate of at least about 10 $cm^3/100\ in^2/24$ hours and an $O_2$ permeability rate of less than about 5.3 $cm^3/100\ in^2/24$ hours.

4 Claims, No Drawings

FILM STRUCTURES AND PACKAGES THEREFROM USEFUL FOR RESPIRING FOOD PRODUCTS THAT RELEASE $CO_2$ AMOUNTS

FIELD OF THE INVENTION

The invention relates to multilayer laminates useful in the packaging of respiring food products such as swiss-type cheeses. More specifically, the invention relates to multilayer laminates, and packages made therefrom, having high carbon dioxide ($CO_2$) permeability rates while maintaining low oxygen ($O_2$) permeability rates.

BACKGROUND OF THE INVENTION

Polymeric film structures and packages made therefrom are useful in the packaging field for the packaging of food products, especially respiring food products such as natural cheeses. These film structures and the packages made therefrom generally contain multiple layers of polymers in which each layer adds certain physical or chemical properties to the completed film or package made therefrom.

Certain packaging problems are encountered when packaging respiring food products such as natural cheese (i.e., swiss-type cheese). These packaging problems exist due to the process by which the respiring product is made and the packaging requirements of the final product. For example, swiss-type cheeses are made utilizing specific molds or bacteria to produce the "eyes", i.e., voids in the cheese that are characteristic of this type of cheese. Specifically, swiss-type cheeses are ripened by typically adding bacteria such as *Propionibacter Shermanii* to form the "eyes" of the cheese. These "eyes" are formed as gas pockets of $CO_2$ which is given off by the swiss-type cheese. This $CO_2$ elimination not only occurs during production of cheese but continuing during the "life" of the product, including the life of the packaged product. Too much $CO_2$ inside the package causes the package to "pillow." "Pillowed" packages are negatively received by the consumer. Also, natural food products such as swiss-type cheeses are affected by atmospheric oxygen ($O_2$) during the transporting and storing of this type of product in a package. If the permeability of $O_2$ into a package is too rapid, the product "life" is shorter. Shorter product life affects the financial aspects of the product. Therefore, these inherent problems associated with respiring food products such as swiss-type cheeses must be addressed by utilizing film structures and packages made therefrom which will deal with these problems in an efficient manner.

The problems described above are evident in the packaging of most respiring food products and the known products typically are suitable for these uses. However, there are further problems associated with the packaging of respiring food products which generate higher levels of $CO_2$ naturally, such as the packing of large quantities of cheese. As can be appreciated, the weight of a block of cheese can be doubled by doubling the thickness of the cheese. However, doubling the thickness of the package to accommodate the larger weight typically does not double the area of the package. Therefore, the generation of a large amount of $CO_2$ may result in an amount of $CO_2$ that can not be accommodated by the film structure without decreasing the effectiveness of oxygen barrier.

Therefore, there exists a need for a film structure and package that can allow $CO_2$ to flow out of a package containing a large quantity of respiring food yet also allow in flow of a limited quantity of $O_2$ while providing stiffness, and a moisture barrier and maximizing flex crack resistance. Also, the film structures and packages must be cost-effective.

DESCRIPTION OF THE PRIOR ART

Different approaches have been taken to addressing the aforementioned problems associated with the packaging of respiring food products such as swiss-type cheeses For example, U.S. Pat. No. 6,316,067 discloses a multi-layer cheese packaging film and packages made therefrom having high $CO_2$ permeability and low $O_2$ permeability. These permeability rates are achieved by having at least one layer, preferably the core layer of the film structure, comprising a blend of nylon 6/66 copolymer and ethylene vinyl alcohol copolymer.

Also, U.S. Pat. No. 7,008,677 discloses a four-layer film and a package for cheese packaging. The film comprises a polyamide $CO_2/O_2$ permeability layer, an adhesive comprising polyethylene to bind the polyamide outer layer to a polypropylene-containing moisture barrier layer, and an inner sealant layer comprising polyethylene copolymer. According to this patent, the $CO_2$ and $O_2$ permeability rates can be adjusted by adjusting the thickness or the composition of the polyamide layer.

SUMMARY OF THE INVENTION

In one embodiment, the present invention is a film structure having a high carbon dioxide permeability rate while maintaining a low oxygen permeability rate.

In another embodiment, the film structure has good stiffness and moisture barrier. In another embodiment, the invention provides a film structure having at least four layers.

Another embodiment of the present invention provides a film structure having a high carbon dioxide ($CO_2$) permeable layer.

In another embodiment, a moisture barrier layer is provided outside a layer having a high $CO_2$ permeability rate while maintaining a low oxygen permeability rate.

In still another embodiment of the invention, a film structure that can be made into packages for the transporting and storing larger amounts of respiring food products, especially swiss-type cheeses, is used to make packages having reduced pillowing during use and afford longer shelf life.

Still another embodiment of the invention is directed to a film structure comprising at least four layers, wherein the film structure has a high carbon dioxide permeability rate and a low oxygen permeability rate. The film structure can then be used to form packages for the transporting and storing of respiring food products, particularly for layer amounts of respiring products and for products that respire more heavily than typical products.

DEFINITIONS

As used herein, the term "extrusion coating" is process of coating resin onto a substrate (paper, fabric, film, foil) by extruding a thin film or web of molten resin directly onto the substrate without the use of adhesive.

As used herein, the term "extrusion lamination" is a process of bonding together two or more substrates, such as polymeric films, by means of a molten polymer as the adhesive.

As used herein, the term "carbon dioxide ($CO_2$) permeability rate" is defined as the volume of gas ($CO_2$) in $cm^3$ which passes through 100 square inches of film in a twenty-four hour period at room temperature and 1 atmosphere of pressure.

As used herein, the term "oxygen ($O_2$) permeability rate" is defined as the volume of gas which passes through 100 square inches of film in a twenty-four hour period at room temperature and 1 atmosphere of pressure.

As used herein, the term "gauge" refers to the thickness of a film, with 100 gauge=1 mil. Thus, a 48 gauge film has a thickness of 0.00048 in.

As used herein, the term "polyethylene" refers to an ethylene homopolymer and/or copolymer of a high percentage of ethylene with one or more alpha olefins.

As used herein, the term "ethylene vinyl acetate copolymer" refers to a copolymer formed from ethylene and vinyl acetate monomers, wherein the ethylene monomer portion is present in a higher percentage by weight than the vinyl acetate monomer portion of the ethylene vinyl acetate copolymer.

As used herein, the term "high $CO_2$ permeability" refers to a $CO_2$ permeability rate from about 10 $cm^3$ to about 40 $cm^3$ per 100 $in^2$/24 hrs. at room temperature and 1 atmosphere.

As used herein, the term "respiring food product" is defined as a food product that gives off a gas such as carbon dioxide ($CO_2$).

As used herein, the phrase "sealant layer" with respect to multilayer films, refers to that layer in direct contact with the packaged product.

As used herein, the term "swiss-type cheese or cheeses" are defined as a cheese having "eyes" formed by $CO_2$.

As used herein, the phrase "outer layer" refers to that layer of the multi-layer film which is typically an outermost, usually surface, layer of said multilayer film. It is also understood than an additional layer, or layers or other substrates, can be made to adhere to it.

As used herein, with respect to multilayer films, the phrase "core layer" refers to any internal film layer which has a primary function other than serving as an adhesive or compatibility agent for adhering two layers to one another.

As used herein and applied to film layers, the phrase "directly adhered" is defined as adhesion of the subject film layer to the object film layer.

As used herein, the term "polyamide" refers to both polyamides and copolyamides, and means a polymer in which amide linkages (—COHN—) occur along the molecular chain. Examples are nylon 6, nylon 11, nylon 12, nylon 66 (or 6,6), nylon 69 (or 6,9), nylon 6/10 (or 6,10), nylon 6/12 (or 6/12), nylon 6/66 (or 6,66), and amorphous polyamide.

DETAILED DESCRIPTION OF THE INVENTION

The film structures of embodiments of the invention may be used as high carbon dioxide permeable and low oxygen permeable films for the curing, transporting and storing of respiring food products such as swiss-type cheeses. In particular, the film structures of embodiments of the invention have a high ratio of $CO_2$ permeability to $O_2$ permeability, making them especially suitable for higher weight packages of foods that respire and for products that release relatively large amounts of $CO_2$.

The film structures of embodiments of the invention can be formed into packages for the curing, transporting and storing of respiring food products. These packages are made by technology known to those skilled in the art. The particular shape, size and structure of the packages which can be made from the film structures of embodiments of the invention will be governed by the type and size of the specific respiring product and the particular problems to be overcome in its packaging.

Embodiments of the invention are particularly useful in the packaging of swiss-type cheeses. This type of cheeses produces "eyeholes" during processing. These "eyeholes" are produced by pockets of carbon dioxide generated by $CO_2$ producing bacteria such as *Propionibacter Shermanii*. Although embodiments of the present invention have been described for use in the packaging of swiss-type cheeses, embodiments also can be employed for the packaging of a number of other cheeses, such as but not limited to Emmental, Jarlsberg, Gruyere, and Herregaardsost. It is also envisioned that the film structures of embodiments of the invention and packages made therefrom would also be useful in the transporting and storing of other food products such as coffee and produce.

In particular, embodiments of the invention are particularly suited for uses requiring a high $CO_2$ permeability rate to $O_2$ permeability rate. This high ratio enables escape of $CO_2$ to avoid "pillowing" and only a modest ingress of $O_2$, to ensure continuing freshness.

As the skilled practitioner recognizes, the area of the packaging does not increase at the same rate that the mass of $CO_2$-liberating product increases. For example, consider 1 pound of swiss cheese packaged in a parallelepiped measuring 4 inches×8 inches×1 inch think. The package has an area of 88 $in^2$, which is adequate to allow $CO_2$ to escape from 1 pound of swiss cheese without causing a pillow effect. Then, consider 3 pounds of cheese in a parallelepiped 4 inches×8 inches×3 inches thick. Although the $CO_2$ respiration rate from the cheese now has increased approximately by a factor of 3, the area of the package has increased only about 55%. In this example, the $CO_2$ permeation rate of the film of the 3 pound package would need to be about double that of the 1 pound package to avoid the "pillow" effect.

Thus, the need for a high $CO_2$ permeation rate under these circumstances is clear. Equally clear is the fact that the $O_2$ permeation rate preferably remains low to help ensure the quality of the packaged product is maintained throughout its shelf life.

Embodiments of the present invention have a $CO_2$ permeability rate of from about 10 $cm^3$ per 100 $in^2$/24 hrs to about 40 $cm^3$ per 100 $in^2$/24 hrs at room temperature (73° F.) and 1 atmosphere (ambient atmosphere 101325 Pa). A preferred $CO_2$ permeability rate is from about 13 $cm^3$ per 100 $in^2$/24 hrs at room temperature and 1 atmosphere to about 16 $cm^3$ per 100 $in^2$/24 hrs at room temperature and 1 atmosphere.

Embodiments of the present invention have an oxygen ($O_2$) permeability rate of from about 2.5 $cm^3$ per 100 $in^2$/24 hr at room temperature and 1 atmosphere to about 5.3 $cm^3$ per 100 $in^2$/24 hr at room temperature and 1 atmosphere. A preferred $O_2$ permeability rate is from about 3 $cm^3$ per 100 $in^2$/24 hr at room temperature and 1 atmosphere to about 4 $cm^3$ per 100 $in^2$/24 hr at room temperature and 1 atmosphere.

In an embodiment, the desirable high $CO_2$ permeability rate and low $O_2$ permeability rate are achieved by using a packaging film structure wherein at least one layer of the packaging film structure comprises a polyamide and this layer is between the interior of the package and a layer of moisture barrier polymer. The inventors have discovered that a higher moisture level increases the $CO_2$ permeability rate of the polyamide layer without significantly increasing the oxygen permeability rate.

To achieve a $CO_2$ permeability rate of between about 13 and about 16 $cm^3$/100 $in^2$/24 hours with an $O_2$ permeation rate of between about 3 and about 4 $cm^3$/100 $in^2$/24 hours, a polyamide layer having a thickness between about 36 and about 60 gauge would typically be suitable.

A preferred ratio of $CO_2$ permeability to $O_2$ permeability for film structures of the present invention is an $CO_2$ permeability from about 13 $cm^3$ per 100 $in^2$/24 hr at room temperature and 1 atmosphere and an $O_2$ permeability of from about 3 to 4 $cm^3$ per 100 $in^2$/24 hr at room temperature and 1 atmosphere. This ratio can be achieved using a 60 gauge polyamide, preferably poly ($\epsilon$-caprolactam) (nylon 6), layer in the film structure.

Another preferred ratio of $CO_2$ permeability to $O_2$ permeability for film structures of the present invention is an $CO_2$ permeability of from about 16 $cm^3$ per 100 $in^2$/24 hr at room temperature and 1 atmosphere and an $O_2$ permeability of from about 4 to 5 $cm^3$ per 100 $in^2$/24 hr at room temperature and 1 atmosphere. This ratio can be achieved using a 48 gauge polyamide, preferably poly ($\epsilon$-caprolactam) (nylon 6), in the amide layer of the film structure.

The above preferred embodiments of the present invention provided a packaging film structure having very high $CO_2$ permeability rates while maintaining a low $O_2$ permeability rate. These preferred embodiments provide a packaging film structure wherein packages formed from the film structures have reduced pillowing and longer shelf life, close to 6 months.

The polyamide layer of the film structure may have a thickness of from about 40 to about 80 gauge with about 48 to about 60 gauge being preferred.

While it is preferred that the amide layer consist essentially of a single polyamide to obtain the desirable high $CO_2$ permeability rate and the low $O_2$ permeability rate, it is also recognized that this layer may be comprised of a blend of different polyamides in various amounts. It is also recognized that this layer may comprise, in addition to the polyamide or polyamide blend, other additives including processing aids.

In a particularly preferred embodiment of the present invention, the film structure is a four layer structure. The total film structure may have a thickness from about 2.5 to about 3.5 mils, and preferably has a thickness from about 3.0 to about 3.2 mils.

In this embodiment, a water barrier forms the outside layer of the packaging film. This water vapor barrier keeps moisture in the package, thus providing a greater $CO_2$ permeation rate (without adversely affecting the $O_2$ permeation rate) than the same amide film with having lower moisture levels.

Thus, the water barrier vapor must be further from the matter stored than the polyamide layer. In a preferred embodiment, this water vapor barrier is the outside layer. The next layer typically will be an adhesive to ensure that the moisture barrier layer is securely fixed to the polyamide layer. A sealant layer typically is disposed on the inner side of the polyamide layer adjacent the product. Thus, the layers, in order from outside to inside, of a packaging film of a preferred embodiment of the invention comprise water barrier, polyamide and sealant.

The outer layer comprises a water barrier, and provides moisture barrier properties suitable for obtaining the necessary permeation rates and maintaining the quality of the product packaged.

A sealant layer forms the face of the film that faces or contacts the product packaged. The polyamide layer is between the outer, water barrier layer and the inner sealant layer.

Another embodiment comprises four layers. In addition to the 3 layers (outer, amide, inner) described above, another embodiment includes an adhesive layer between the outer layer and the amide layer. In another embodiment, these 4 layers are adhered directly to the next layer, in sequence, so that the outer layer is adhered to the adhesive layer, which is adhered to a first side of the amide layer, and the sealant layer is adhered to a second side of the amide layer.

The outer, water barrier layer comprises polymer selected from the group consisting of oriented polypropylene, polypropylene, PVDC coated films, and high density polyethylene (HDPE). A preferred moisture barrier polymer is oriented polypropylene. A particularly preferred oriented polypropylene is available from AET as film #B503. It is to be understood that while the moisture barrier polymer has been exemplified by a single polymer, i.e., oriented polypropylene, a blend (two or more) of moisture barrier polymers is also contemplated by this invention.

Also, as the exterior layer of the film structure it will regulate the egress of the $CO_2$ gas to the outside and the ingress of $O_2$ through a combination of resin material and thickness (gauge) of the first outer layer.

In this embodiment, disposed in contact with one surface of the above-described outer layer is a second layer comprising a polyethylene homopolymer or a polyethylene copolymer. The purpose of this layer is to adhere the water barrier layer to the amide layer. Suitable polyethylenes for the practice of this invention are exemplified by but not limited to low density polyethylene (LDPE), linear low density polyethylene (LLDPE) and ethylmethylacrylate (EMA).

The second layer of the film structure serves as an adhesive layer to bind the polyamide layer of the film to the moisture barrier layer of the film structure. While polyethylenes are exemplified as useful as adhesives for binding the polyamide layer to the moisture barrier layer, other polymers which would function as an adhesive could also be used. Another polymer which could also function as an adhesive is exemplified by, but not limited to, polyurethane.

Other adhesives for use in the present invention can be exemplified by, but not limited to, waterborne, hot-melt and solvent-borne type adhesives.

The amide layer comprises a polyamide or a polyamide blend wherein the polyamide is independently selected from the groups consisting of poly (hexamethylene sebacinimide) [nylon 6,10], poly (hexamethylene adipamide) [nylon 6,6] and poly ($\epsilon$-caprolactam [nylon 6]. A preferred polyamide is poly ($\epsilon$-caprolactam). The polyamides useful in the practice of this invention will have a layer thickness of about 40 to about 80 gauge, with a thickness of about 48 to about 60 gauge being preferred. A suitable polyamide for practice in this layer is supplied by Honeywell or American Biaxis.

The sealant layer is disposed in contact with the third layer of the film structure. The sealant layer comprises a polyethylene copolymer or a polyethylene copolymer blend, wherein the polyethylene copolymer is exemplified by, but not limited to, ethylene vinyl acetate copolymer.

The present invention recognizes that the $CO_2$ and the $O_2$ permeability rate are mainly regulated by the selection of the polymer for the amide layer. The use of a moisture barrier as the outermost layer increases the moisture concentration at the amide layer and selectively increases the $CO_2$ permeation rate without significantly adversely affected the $O_2$ permeation rate. The $CO_2$ permeability rate and the $O_2$ permeability rate may be adjusted by selecting polyamides having different thicknesses (gauge). The $CO_2$ permeability rate and the $O_2$ permeability rate may also be adjusted by blending different polyamides of different thickness or adjusting the thickness of a single polyamide layer. Adjustment of the $CO_2$ permeability rate is desirable because different cheeses and other products that respire have different relative $CO_2$ permeability and $O_2$ permeability requirements.

The $CO_2$ permeability rates are determined by the following procedure: "Carbon Dioxide Gas Transmission Rate ($CO_2$GTR): Carbon dioxide gas permeability of film was measured by using an infrared sensor and recorder which is available under the trademark Permatran C-IV by Mocon Testing of Minneapolis, Minn., U.S.A. Each tubular film is cut open to form a flattened sheet. A single thickness of each film sheet is clamped between upper and lower halves of a diffusion cell having dimensions defining a 50 $cm^2$ test area. Carbon dioxide gas (100%) is placed into the upper halve of the diffusion cell. A nitrogen carrier gas, which is free of carbon dioxide, is flushed into the bottom half of the diffusion cell. This cell is then connected to an infrared sensor and pump creating a closed loop for circulation of the trapped nitrogen carrier gas. The infrared sensor monitors increases in connection of $CO_2$ as carbon dioxide diffuses through the test film into the closed loop of nitrogen gas, and presents a voltage trace on a strip chart recorder. This trace represents the amount of carbon dioxide diffusing. The carbon dioxide gas transmission rate is derived from the slope of the voltage trace; the instrument having been calibrated by recording voltage changes which correspond to measured amounts of $CO_2$ injected into the instrument."

The $O_2$ permeability rates are determined by the Oxygen Gas Transmission Rate ($O_2$GTR) ASTM D-3985-81.

The film structures of the present invention permit the curing, transporting and storing of layer packages swiss-type cheese products by having a high $CO_2$ permeability rate while maintaining a low $O_2$ permeability rate and low water vapor permeability (about 0.3 grams/100 $in^2$/day at 100° F./90% RH). This combination of properties provides a longer shelf life (up to 6 months) for the product stored in the packages formed from the film structures of the present invention as well as an aesthetically pleasing package because of the elimination or reduction of pillowing.

Film structures of the present invention typically are formed by an extrusion coating process. Preferably, the outer layer which is also in the form of a film is laminated to the amide layer which is also in the form of a film via a molten polymer. The sealant layer (molten polymer) is then coated on to the surface of the amide layer opposite the surface which is in contact with the second layer. Film structures of the present invention may also be formed by an adhesive lamination process wherein the adhesive is exemplified by polyurethane.

Other technologies also can be utilized, such as coextrusion and lamination. For example, the base film may be extruded into a film using a flat die, or extruded into a film using an annular die, and the heat seal layer formed thereon by solvent deposition, lamination or coextrusion techniques. An example of method for manufacturing the multilayer film of the present invention is via simultaneous coextrusion in an annular die of all the layers of the multilayer film described herein.

Film structures of the present invention may also be affixed to a second substrate wherein the substrate may be another polymeric film structure or a non-polymeric structure such as foil or paper. These structures which may be formed into packages may also be used for the storing and transporting of respiring products such as cheeses.

As is acknowledged by those skilled in the art, polymers may be modified by blending two or more polymers together and it is contemplated the various polymers may be blended into individual layers of the present film structure. It is also contemplated that an additional layer or layers wherein said layer or layers may independently contain one or more polymers may also be part of the film structures of the present invention. It is further contemplated that any layer of the present film structure or any additional layer to the present film structure may also contain processing aids, coloring, printing, and other common expedients for such materials.

I claim:

1. A multilayer respiring packaging laminate comprising an inner sealant layer, an outer moisture barrier layer, and a layer consisting essentially of amide between the inner and outer layers, and having a $CO_2$ permeability rate of at least about 10 $cm^3$/100 $in^2$/24 hours and an $O_2$ permeability rate of less than about 5.3 $cm^3$/100 $in^2$/24 hours, wherein the inner sealant layer is selected from the group consisting of a polyethylene copolymer or a polyethylene copolymer blend, and the outer moisture barrier layer is selected from the group consisting of oriented polypropylene, polypropylene, and high density polyethylene.

2. The laminate of claim 1 wherein the amide layer is selected from the group consisting of poly (hexamethylene sebacinimide) [nylon 6,10], poly (hexamethylene adipamide) [nylon 6,6] and poly (E-caprolactam) [nylon 6].

3. The laminate of claim 1 further comprising an adhesive layer.

4. The laminate of claim 3 wherein the layers are adhered directly to each other in the following sequence: outer layer, adhesive, amide layer, sealant.

* * * * *